(12) United States Patent
Gutierrez-Hedges et al.

(10) Patent No.: US 7,543,886 B2
(45) Date of Patent: Jun. 9, 2009

(54) CHILD CAR SEAT WITH ALTERNATE MOBILITY ATTRIBUTES

(76) Inventors: Suzanne Gutierrez-Hedges, 16653 Covello St., Van Nuys, CA (US) 91406; Ewward Hedges, 16653 Covello St., Van Nuys, CA (US) 91406; Lisa Hubbard, 3383 N. Knoll Blvd., Wauwatosa, WI (US) 53222

( * ) Notice: Subject to any disclaimer, the term of this patent is extended or adjusted under 35 U.S.C. 154(b) by 70 days.

(21) Appl. No.: 11/863,774

(22) Filed: Sep. 28, 2007

(65) Prior Publication Data

US 2008/0079293 A1 Apr. 3, 2008

Related U.S. Application Data

(60) Provisional application No. 60/848,006, filed on Sep. 29, 2006.

(51) Int. Cl.
*B60N 2/32* (2006.01)
(52) U.S. Cl. .................... 297/118; 297/130; 280/30
(58) Field of Classification Search ............... 297/118, 297/130, 344.18; 280/30 X, 643
See application file for complete search history.

(56) References Cited

U.S. PATENT DOCUMENTS

| | | | | |
|---|---|---|---|---|
| 4,718,715 | A * | 1/1988 | Ho | ............... 297/130 |
| D310,054 | S | 8/1990 | Tucket et al. | |
| D330,527 | S | 10/1992 | Jones | |
| D358,058 | S | 5/1995 | Anthony et al. | |
| 5,823,547 | A | 10/1998 | Otobe et al. | |
| 6,237,995 | B1 * | 5/2001 | Dierickx | ............... 297/130 |
| 6,296,259 | B1 | 10/2001 | Anderson | |
| 6,367,821 | B2 | 4/2002 | Thiele | |
| D471,727 | S | 3/2003 | King et al. | |
| 6,655,702 | B2 | 12/2003 | Senger | |
| 6,729,630 | B2 | 5/2004 | Szmidt et al. | |
| 6,976,685 | B1 | 12/2005 | King et al. | |
| 7,311,353 | B1 * | 12/2007 | Johnson | ............... 297/130 |

FOREIGN PATENT DOCUMENTS

FR 2587889 A3 * 4/1987

OTHER PUBLICATIONS

BabyTrend Snap and Go Stroller Product Sheet.
Stolex Stroller Product Sheet.
Triple Play Products Product Sheet.

* cited by examiner

*Primary Examiner*—Anthony D Barfield
(74) *Attorney, Agent, or Firm*—Law Office of Ken Dallara; Ken Dallara

(57) ABSTRACT

An unique system and method for an improved infant car seat having an integral extra transportation apparatus combining the functionality of a car seat with a stroller into one device. The apparatus generally resembles a conventional infant car seat but with an overhead handle that can be extracted from behind the headrest with a set of two folding legs extending downward and locking in place. Each extended leg has a pair of wheels that when used in conjunction with the handle allows the entire apparatus to serve as an infant stroller in a manner similar to a wheelbarrow. A third brace leg has a stabilizing rubber foot that extends down from behind the seat to allow the apparatus to safely stand unassisted. This novel apparatus and system will permit a care giver to remove the apparatus from a vehicle with the infant remaining in the seat, and by extending the legs into place, transform the apparatus into a stroller.

13 Claims, 3 Drawing Sheets

Figure 1
Figure 1A
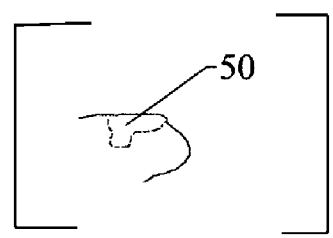
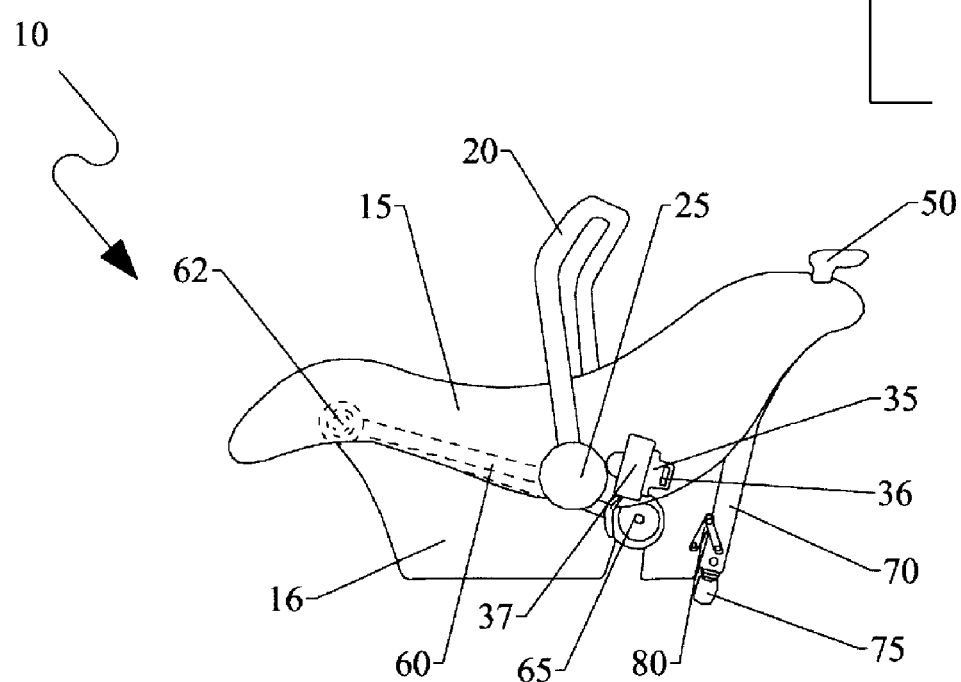

CHILD CAR SEAT WITH ALTERNATE MOBILITY ATTRIBUTES

RELATED APPLICATIONS

The present invention was first described in Disclosure Document No. 594,115 on Feb. 2, 2006. The present invention was disclosed, and claims all benefits thereof, in Provisional Application 60/848,006 filed Sep. 29, 2006 which is herein incorporated by reference in it's entirety.

FIELD OF THE INVENTION

The present invention relates generally to a unique system and method for an improved child car seat and, more particularly, to said infant car seat having an integral multi-transportational apparatus combining the functionality of a car seat with the mobility of a stroller-like device, or as a car seat carried from one location to another, and the adaptability of a child's high chair into one combined apparatus. It is further unique to allow for the operation of such a device with a minimal of bending or stooping. This device is basically designed to be used with infants but any child in need of transport and seating assistance can be accommodated.

MOTIVATION FOR THE INVENTION

Infants require special care in order protect them safe from harm. As a result, there is a myriad of products intended to provide protection from a variety of dangers. Perhaps two of the most common items for infant safety are the car seat and the stroller. These two items securely hold the infant in place, protect them while being transported and allow them to be moved from place to place with relative ease. While combination units do exist, they suffer from inherent deficiencies resulting in having the two separate devices that connect into one. Accordingly, there is a need to safely and economically address the deficiencies. The development of the invention herein described fulfills this need.

The invention is an apparatus that combines the functionality of a car seat and a stroller-like transportational apparatus amongst other apparatuses, into one device. Upon initial observation, the invention looks like a conventional car seat. However, after closer observation, it can be seen that an overhead handle pulls out from behind the headrest and a set of two folding legs extend downward and snap into place. Each leg has a set of wheels, which, when used in conjunction with the handle, allow the invention to serve as a stroller-like transportation means following the same functionality of a stroller while having the attributes of a high chair and an infant or child carrying apparatus. A third brace leg, with a rubber foot, extends down from behind the seat to allow it to stand unassisted. Varying styles of brace legs are described. The term stroller is used to describe the ambulatory movement of the device with wheels for the purpose of transporting a child. This inventions main purpose is not that of a stroller as the term is commonly used. Such features allow a parent or care giver to remove the invention from a car with the infant or child still in place, and by extending the legs into place, transform it into a stroller-like transportation means without disturbing the child and the parent or caregiver is able to perform these tasks in an ergonomically proscribed manner without bending or stooping. The creation and the development of the combined apparatus provides the separate functionality of a car seat and stroller in an efficient manner.

Prior art where strollers are combined with car seats are basically found in two categories; Snap together and strollers combinations. Snap together are the most popular where leading companies, such as Graco and BabyTrend, create products where the car seat can be detached from a base unit and snapped into a specially designed carrier that has wheels and functions like a normal baby stroller. These units require a two hand operation of snapping and unsnapping the units to and from the car seat base requiring very awkward body position of the operator. The stroller also needs to be removed from the storage location, often the trunk of the car, while the baby is left alone. These units are often very expensive and require two separate items to be taken together for use at different locations. The present invention solves these problems by economically producing a product that can be activated while the parent and baby are together at all times and does not require separate storage of the stroller unit.

Combination units, such as those described in U.S. Pat. No. 5,823,547 issued to Otobe et al on Oct. 20, 1998, U.S. Pat. No. 6,367,821 issued to Thiele on Apr. 9, 2002 and U.S. Pat. No. 6,729,630, are closer to the present invention. All patents detail products that combine a car seat with an apparatus can be used as a stroller. Both '821 and '630 are simply car seats with a pair of wheels attached to the rear of the car seat, '821 having the means to extend the wheels at an oblique angle to facilitate a greater range of inclination. Both come with extendable handles. '547 is a highly complex apparatus which combines a 4 wheel stroller, where the undercarriage collapses into the periphery of the exterior of the car seat, a place rift for baby's fingers to be caught therebetween. All patents disclose only a single variable for height, which is either ground level for '821 and '630 or at a single height for '547 which is a foot or so from the floor, limited by the length of the seat portion of the car seat.

What is needed is for a car seat that can be quickly changed into a stroller-like transportation means which does not require alternate entities to complete the apparatus. It is an object of this invention to create a combination car seat and stroller-like apparatus in which the stroller apparatus is integral with the car seat.

What is also needed is for the car seat and a stroller apparatus to be of such a height as to enable the operator to locate the child at a variety of levels and inclinations. It is another object of this invention to have the child or infant at a level that is conducive to eating and capable of being seen by adults. Multiple heights are advantageous to adapting to many different situations.

What is also needed is to have a car seat and stroller apparatus that can be operated from a standing position without the need for the operator to constantly have to raise and lower a sleeping child or worse a kicking and screaming child, to and from the carrier apparatus or to activate the carrier apparatus. It is another object of this invention to create an apparatus that is capable of being activated while in the standing position by allowing the user to strap this apparatus to themselves around their waist and activate the stroller legs into the desired location.

What is also needed is to create a car seat/stroller combination that places the wheels and supporting apparatus into a location where toddlers and children fingers might not be tangled, pinched or generally affected by the operation and storage of the undercarriage. It is another object of this invention to create a car seat/stroller combination where the undercarriage retracts to a location whereby childrens' and infants' fingers will not be affect by the operation and storage of the undercarriage.

What is also needed is a device whereby an infant or child can be placed near an eating table with some kind of mobility to position the device in the best manner for the situation, yet not having to lock or secure the wheels of the device. It is another object of this invention to create a device which can limit the mobility of the device without having to reach down and lock/unlock the locking mechanisms.

These objects will hereby be described in detail in the description of the invention. This invention creates an apparatus that combines a child car seat, capable for use with infants or children, by changing the design of the seat itself, where mobility attributes include the ability of the transport of the child in a car, by carrying the car seat using the handle, carrying the car seat through the use of a waistband and by using the apparatus as a stroller like transportation means whose height is appropriate for placing the child more at the level of an adult rather than at the floor level. This one apparatus can replace a multitude of devices from car seats, strollers, booster seats and baby carriers.

DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a side view of an improved infant car seat including transportation 25 means 10 in a retracted orientation with a transparent view to illustrate the placement of a extension leg member 60, according to the preferred embodiment of the present invention, also included is FIG. 1A showing an embodiment of the placement of the handle in a submerged location.

DESCRIPTIVE KEY OF THE DRAWING ELEMENTS

Figure 2:
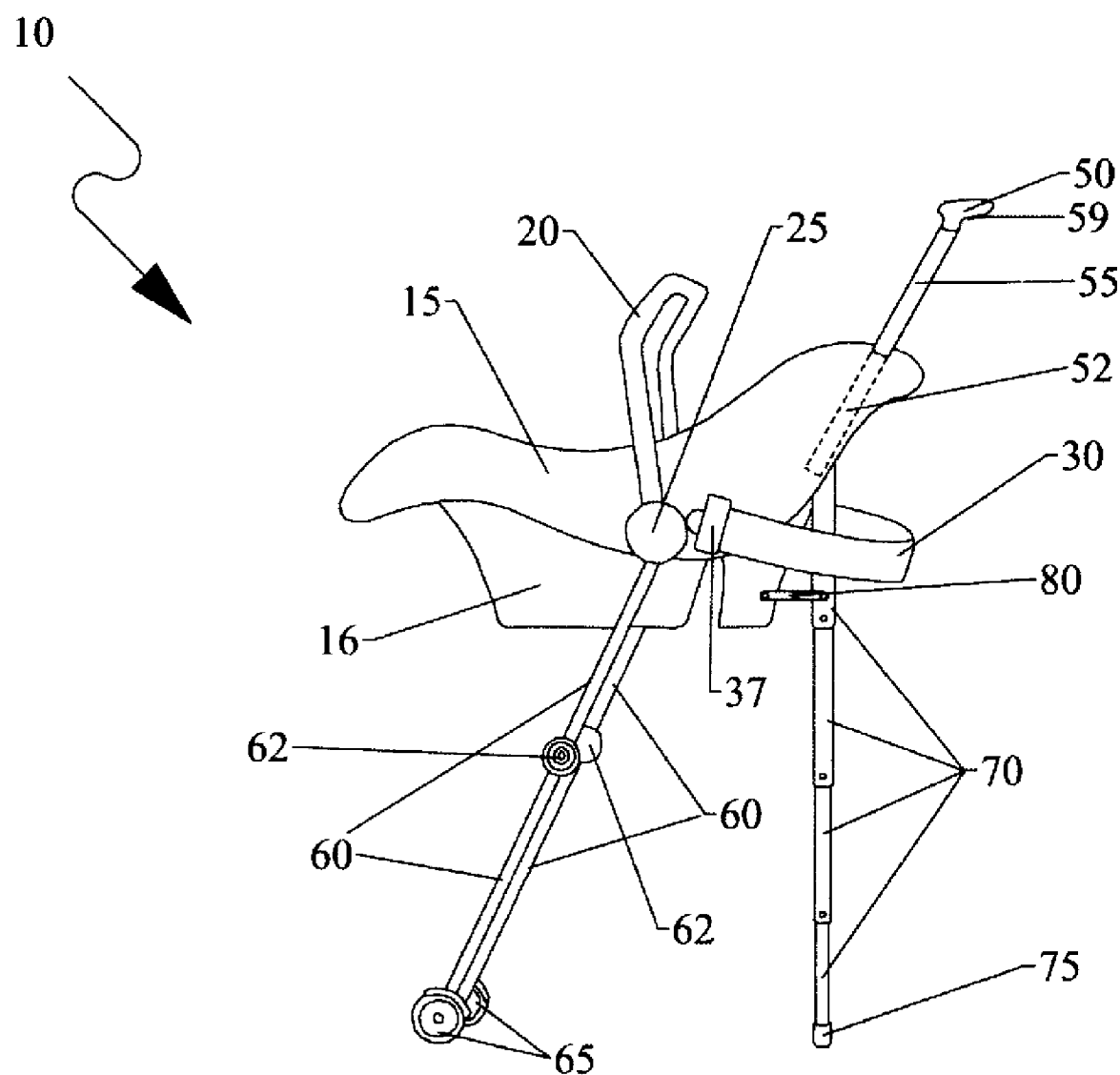
FIG. 2 is a side view of the improved infant car seat including transportation means 10 in an extended orientation with a transparent view to illustrate the placement of a vertically inclined member 55, according to the preferred embodiment of the present invention; and, FIG. 3 is a rear view of the improved infant car seat including transportation means 10 in an extended orientation, according to the preferred embodiment of the present invention.

The Figures in Drawing FIGS. 1-3 inclusive contain some of the following elements as described below:
10 improved infant car seat including mobility attachments
15 padding
16 infant/child seat
20 handle
25 primary pivot
30 waistband
35 male clip portion
36 aperture
37 waistband housing
50 gripped handle
52 mating tube
55 vertically inclined member
59 release lever
60 extendable leg
62 intermediate pivot
65 wheel
70 brace leg
75 rubber bar
80 operation lever

DETAILED DESCRIPTION OF THE FIGURES AND DRAWING ELEMENTS

Figure 3:
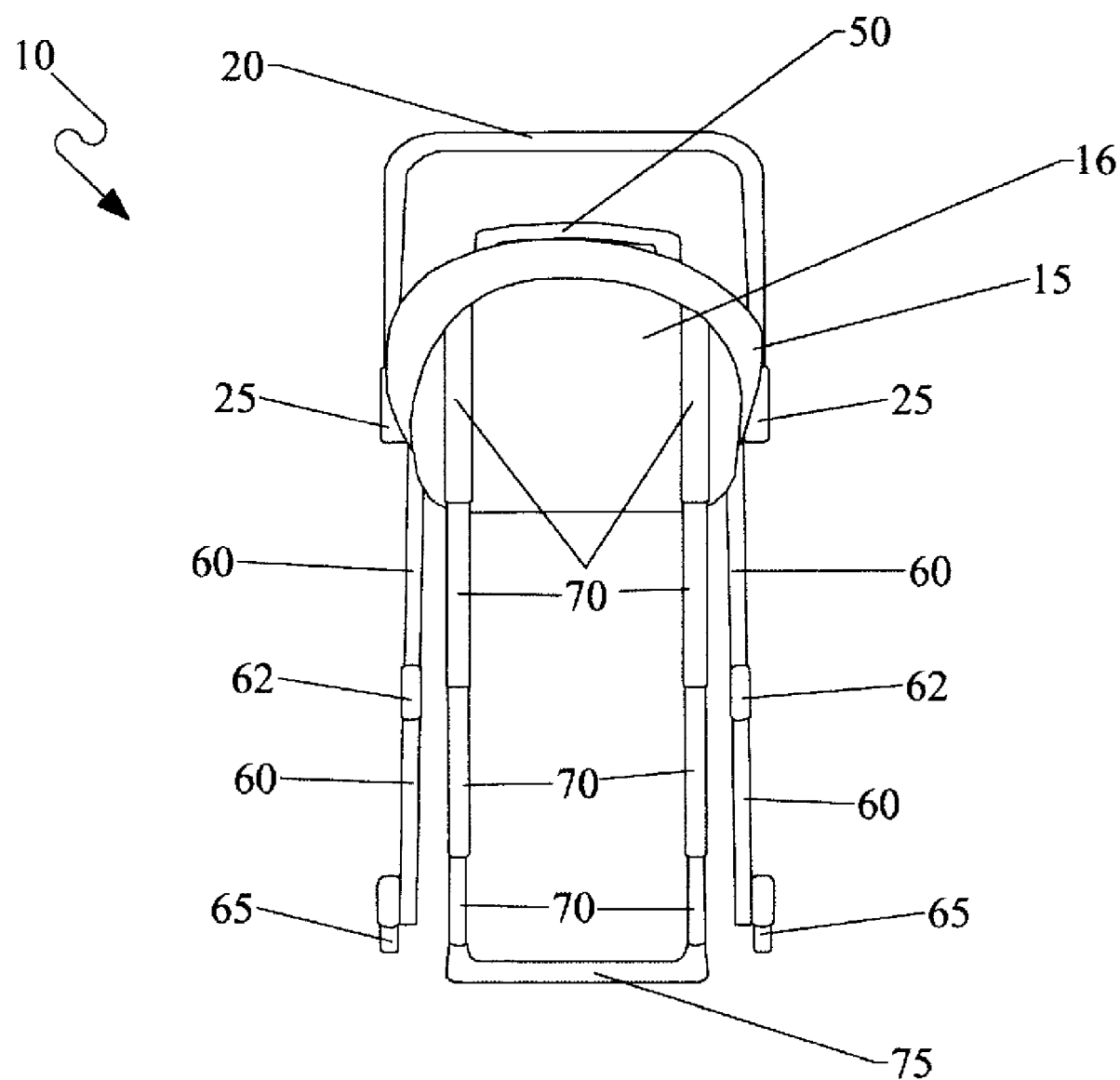

The best mode for carrying out the invention is presented in terms of its preferred embodiment, herein depicted within FIGS. 1 through 3. The present invention as presented in this application describes an apparatus and method that aids in the securement, carriage, and transportation of an child in particular an infant. This invention is not limited to solely infants as toddlers and child seats can also be used in this arrangement. The best mode for practicing this invention is done with infants. This application presents the best mode for practicing this invention but is not considered a limitation upon the use or suitability for use in other applications.

The improved infant car seat including alternative mobility attributes (herein described as the "apparatus") 10 comprises an infant car seat 16, a waistband 30, retractably extendable handle assembly, a carrying handle 20, extendable leg 30 assembly with devices that increase the ease of mobility, and an adjustably telescopic brace leg 70 having a stabilizing rubber bar 75.

The infant car seat 16 will comprise a shell fabricated of plastic in an injection molding process. The contour of such a shell is customizable to various sizes of infants, babies and children. Padding 15 is secured to said shell in an appropriate manner and infant securement means (not shown) are included to secure that the infant should not leave the confines of seat 16 without parental assistance. Other components of the invention such as the telescopic handle 50, brace leg 70, retractably extendable legs 60, seat belt insert guides, and the like would be made in a similar manner with each item requiring the design and use of custom molds. Further, items such as the seat cover 15 would be made of a padded textile requiring textile cutting and assembly processes.

Referring now to FIG. 1, a side view of the apparatus 10 in the retracted orientation with a transparent view to illustrate the placement of an extension leg member 60 according to the preferred embodiment of the present invention, is disclosed. The apparatus 10 comprises a car seat portion 16 which is adapted to set or lay an infant therein preferably padded 15 for the comfort of the infant. The car seat portion 16 comprises a backside, two (2) sides having a contoured upper edge, and a curved front side for comfortably securing the infant. The car seat portion 16 also comprises a pivotally attached handle 20, attached to the parallel sides of apparatus 10, provided to facilitate in the transport of the apparatus 10 and/or infant when the apparatus 10 is utilized as an infant carrier, which the undercarriage in the retracted position, as depicted in FIG. 1. Handle 20 has several pre-determined "stop" positions where the handle can be locked into a particular position. It should be noted that the design of seat 16 has sides that allow for the retraction of the undercarriage into a location under such sides whereby the infant can not reasonably touch the undercarriage. The apparatus 10 also comprises a fastening means for removably securing thereto a fixed car seat of an automobile.

Referring now to FIGS. 2 and 3, side and rear views of the apparatus 10 according to the preferred embodiment of the present invention, are disclosed. A waistband system 30 is integrated thereon the outer surface of the backside of the apparatus 10 to facilitate in the carriage and transportation of the infant when the apparatus 10 is utilized as an infant carrier. Waistband system can also be utilized to operate the release of the undercarriage without having the raise and lower oneself during this process. The waistband system 30 is envisioned to utilize a clipping mechanism to operably lock the waistband 30 after encircling around a mid-section of a user. The clipping mechanism preferably comprises a male clip portion 35 within a female lock portion (not pictured) receivable to interlock collectively. The female lock portion may be integrated thereon the apparatus 10 or may comprise an aperture for receiving a waistband to permit further extendibility. The male clip portion 35 generally comprises an aperture 36 within a metal extrusion and a means for receiving a waistband 30 at the distal end. The female lock portion generally comprises a main opening sized to receive the metal extrusion of the male portion 35. The female lock portion also comprises one (1) or more posts built therein in communication with the aperture 36 of the metal extrusion of the male clip portion 35. The posts are preferably adapted to engage the aperture 36 of the male clip portion 35 in order to secure the male clip portion 35 into the female lock portion. The female lock portion may comprise a button, switch, latch, or the like built thereon to operably unlock the clipping mechanism when desirable. The button, switch, latch, or the like is utilized to disengage the male clip portion 35 from the female lock portion, thereby allowing the male clip 35 and female lock portions to be separated. Alternately, one end of waistband 30 can be permanent attached to seat 10 with the alternate end having aforedescribed locking portion.

The waistband 30 is envisioned to extend outwardly therefrom the waistband housing 37 to extendibly encircle and securely engage a waist of a user. The waistband 30 is preferably, but not essentially nylon or similar material seat belt-like apparatus, comprising of one (1) or more pieces of durable and resilient material. This waistband 30 securely conforms thereto various waist sizes and shapes. The apparatus 10 is retrofitted with a retractably extendable handle assembly formed generally in a overarching configuration having two (2) vertically inclined members 55 in a parallel arrangement connected at a distal end by a gripped handle 50. The vertically inclined members 55 are envisioned to be of tubular design intended to be telescoping, thereby enabling the handle 50 to be selectively extended and retracted. In this invention, an elliptical profile of the tubular design is used to increase the ability to withstand the torsional and rotational loads to which members 55 will be subjected. Other profiles are to be utilized depending upon strength of materials and load bearing attributes required. All such profiles are considered included in the spirit of this application. The vertically inclined members 55 are slidably received within two (2) mating tube portions 52 for receiving the corresponding ends of the vertically inclined members 55. The handle assembly, comprising the vertically inclined members 55, the gripped handle 50 with a release button 59, and the mating tubes 52, may comprise a plurality of conventional lock-stop positions to permit a user to adjust the length of the handle 50 relative to the apparatus 10 providing a desired vertically inclined member 55 length. The lock-stop positions are achieved via a locking mechanism (not pictured), which is actuated via a spring-loaded release button 59 or other mechanical device, would provide intermediate orientations as well as the fully extended and fully retracted orientations. The vertically inclined members 55 slidably move from an engaged, retracted, extended, or one of a plurality of intermediate orientations therebetween. The handle assembly is envisioned to comprise a release button 59 to freely move the vertically inclined members 55 upwardly and/or downwardly to a plurality of locations while said release button 59 is depressed inwardly. The vertically inclined members 55 slidably move along a vertical axis within said mating tubes 52, movement being audited by spacially incremented indents or detents which can produce an audible and tactile response to each increment of decline or incline until a desirable position is acquired and affixed into position thus providing the handle assembly at a desirable position. The sensory feedback is necessary to insure proper extension or retraction in noisy environments, which is a typical environment for this invention. It is important that the user be able to adjust this apparatus quickly and accurately as their attention can often be misplaced during this time. The gripped handle 50 is positioned in the rear of the infant seat 16. In one embodiment, handle 50 is mostly flush with the surface when the vertically inclined members 55 are fully inserted therewithin the mating tubes 52 in the retracted orientation, as depicted in FIG. 1A. The handle in this position minimally protrudes over the contour of padding 15, providing a lower profile to prevent snags and other impediments to use. Another embodiment, shown in FIG. 1 and FIG. 3, handle 50 is mostly exposed, enabling the user quicker access to said handle. This application discloses a handle with 2 parallel vertically inclined members 55 which enhances the stability and control of the apparatus 10. This does not preclude the use of a single handle with the same attributes of audible or tactile feedback and mating tube, should the operator prefer such an arrangement.

A wheel assembly, comprising two (2) pivotally extendable leg members 60, axles (not pictured), and rotatably attached transportation means to one end of leg members 60, is provided with the present invention. This invention uses wheels where the contact surfaces are coated in an elastomeric compound. An embodiment of this invention is the use of locking rotatable wheels or casters. The two (2) legs 60 are pivotable about the side surfaces having an axle incorporated at the proximal end for rotatably receiving and engaging a wheel 65 thereof. It is envisioned that there are multiple surfaces that will come surfaces to be encountered. Pneumatic wheels for soft cushioning, hard rubber wheels for economical reasons and natural rubber for friction properties are all characteristics best determined by usage and application. The distal ends of the leg members 60 are pivotally integrated or otherwise attached thereto the opposing side surfaces of the infant seat portion 16 via a primary pivot point 25. The extendable legs 60 are envisioned to have a cross-section resembling that of an ellipse, or other shape that will provide maximum strength using the materials provided, providing optimum strength and stabilization. It is envisioned that this apparatus be constructed of materials that are durable and impact-resistant yet lightweight, possibly of composite materials. It is the material's attributes which will define the optimal shape of legs 60 and brace leg 70. The extendable legs 60 comprise a first section and a second section having a pivot or hinge, at an intermediate position 62 to further extend said legs 60. The primary pivot 25 permits the radial extension of the first section about the primary pivot point 25 to extend the leg members 60 and lock into place. The intermediate pivot 62 permits the radial extension of the second section about the pivot point 62 to further extend the leg members 60 and lock into place. Buttons or other disengaging members (not pictured) may be utilized at the intermediate pivot point 62 and/or the primary pivot point 25 to disengage the locked and extended orientation. The extendable legs 60 extend radially outward as a single unit. The space there between the extendable legs 60 are envisioned to be greater than the width of the infant seat portion 16 thereby further providing optimum strength and stabilization. The extendable legs 60 can selectively be moved into a folded position or the retracted orientation, as depicted in FIG. 1, to the extended orientation in which the leg members 60 project angularly downward from the infant seat portion 16, as depicted in FIGS. 2 and 3. The apparatus 10 also features a retractably extendable brace leg assembly comprising two (2) pivotally extendable brace leg members 70, a rubber bar 75, and an extending operation lever 80. The brace leg assembly is formed generally in a configuration having at least one, preferably two (2), pivotally attached members, attached to the rear of infant seat portion with extendable brace leg members 70. Use of 2 brace leg members 70 in a parallel arrangement are connected at the proximal end by a rubber bar 75. A backwardly extending operation lever 80 allows for storage of the brace leg 70 in the retracted position to be as close to the rear of the infant seat as possible as well as serving as a means to secure the brace leg 70 in the proper position. The brace leg members 70 are envisioned to be of tubular design intended to be telescoping enabling the rubber bar 75 to be selectively extended and retracted. The two (2) brace legs 70 are pivotable about the side surfaces positioned on the back portion thereof and locked into the extended orientation via an operation lever 80. The distal ends of the brace leg members 70 are pivotally integrated or otherwise attached thereto the opposing side surfaces of the infant seat portion 16 via a hinge or pivot (not pictured). The brace legs 70 are envisioned to have a cross-section resembling that of an oval providing optimum strength and stabilization. The brace legs 70 comprise a plurality of sections designed such that each section is slightly smaller than the next with the uppermost section being the greatest in size such that the sections may be slid outwardly in the extended orientation or within one another in the retracted orientation. The bar 75 spans across the space therebetween each brace leg member 70 at the proximal ends thereof. The bottom surface of said bar 75 is envisioned to be fabricated of a hard rubber preferably, but not essentially, having grooves, slits, or other corrugations to provide a more frictional force therebetween the bar 75 and the floor. The brace leg assembly is envisioned to span as wide as possible to provide stability to the apparatus 10. The operation lever 80 is disposed between the braced leg members 70 and the outer surface of the backside of the infant seat portion 16. When the braced legs 70 are pulled radially outward, the operation lever 80 is extended and locked into place. It is contemplated that the brace leg members 70 and/or the extendable leg members 60 may be of various sizes and various cross-sectional shapes in accordance with the size of the infant seat portion 16.

An alternate embodiment of the present invention 10 includes other attachment means such as buckles, clipping mechanisms of various designs, or other locking and/or fastening means.

Another alternate embodiment of the present invention 10 may include alternate 10 positions for the extendable leg assembly and the brace leg assembly such that the brace leg assembly would be positioned where the extendable leg assembly is positioned in the preferred embodiment and visa versa.

OPERATION OF THE PREFERRED EMBODIMENT

The preferred embodiment of the present invention can be utilized by the common user in a simple and effortless manner with little or no training. After initial purchase or acquisition of the improved infant car seat with alternate mobility attributes 10, it would be configured as indicated in FIGS. 1 through 3. The method of utilizing the device may be achieved by performing the following steps: removing the device from the location where it is being used as a car seat, securing the waistband around your waist, radially extending the first section of the retractably extendable legs 60 about the primary pivot 25 until locked into position; radially extending the second section of the retractably extendable legs 60 about the intermediate pivot point 62 until locked into position and the wheels 65 are in contact with the floor; pulling the brace legs 70 radially outward therefrom the apparatus 10 until the operation lever 80 is locked; pulling the rubber bar 75 downwardly, slidably extending the brace legs 70 until the bar 75 makes contact with the floor; depressing the release button 59 downwardly to unlock the locking mechanism; and, extending the gripped handle 50 upwardly and outwardly until locked into the desired position. These steps can be accomplished while the user is using the waistband to eliminate the bending and stooping motions.

The apparatus 10 is envisioned to stably position an infant at a height level equidistant from a table or counter of conventional height such that the parent or guardian of the infant may feed said infant while sitting, approximately 30 to 42 inches. Alternatively, the infant may be positioned at various conventional heights such that the infant seat portion 16 will not rest on the floor, dangerously on a bench, or other unsuitable surfaces. The apparatus 10 is not envisioned to be utilized as a long-range stroller but rather utilized to provide diminutive movement of the apparatus 10 such to bring the infant within closer range during feeding or other activities. The rubber bar 75 further stabilizes the apparatus 10 while preventing undesirable movement. The wheels 65 are of sufficient size and geometrically aligned with the apparatus 10 to provide adequate balance and support. If desired to carry, the parent or guardian may follow the steps described aforementioned in the reverse order to retract the apparatus 10 in the retracted orientation. The parent or guardian may then carry the apparatus 10 via the handle 20 with or without securing and using the waistband 30 about the waist.

The configuration of the described device allows the parent to comfortably carry and maneuver the apparatus 10 as desired. Also, the size and shape of the apparatus 10 as well as its relative weight enables it to be treated as a conventional infant seat 16, whether it is carried via a pivotal handle 20, maneuvered via the extendable leg assembly, or secured on a conventional automobile seat.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated.

What is claimed is:

1. An Improved Child Car Seat with Alternate Mobility Attributes Apparatus, said car seat being able to adapt to the needs and comfort of a child from the age of infants through young children, comprised thereof:
   a shell, contoured to accommodate a child in an age appropriate inclination, said shell constructed in a manner suitable for safe transport of said child in said shell during vehicular transport and providing comfort to said child, having a front portion, where said child is loaded into said apparatus and a rear portion which contains age appropriate support for child's back, neck and head and 2 parallel sides joining said front portion to said rear portion,
   a padding contrivance designed to integrate with said shell, providing comfort to said child,
   a restraining means designed to secure said child within the confines of said shell during vehicular transport, a handle, having at least one member, having an attached end integrated with said rear portion of said shell and a gripping end opposite of said attached end, where said handle being integrally capable of being retracted within said rear portion of said shell, said handle having the capability of collapsing or extending, having segments of diminishing circumference, said segments being able to be placed internally in an overlapping fashion within an adjacent segments, a transference grip located near the center of gravity of said shell in relation to said child, said grip consisting to two side connecting members and an over-arching member, said side connecting members pivotally attached to said parallel sides of said shell in an opposing manner, said over-arching member being integrated with said side connecting members, said grip capable of rotational movement near said center of gravity.

at least one brace leg, having a distal end with an elastomeric anti-skid plate and a proximal end attached to said rear end of said shell, having the capability of collapsing or extending, having brace leg segments of diminishing circumference, said brace leg segments being able to be placed internally in an overlapping fashion within an adjacent segments, a set of retractably extended front legs, having a proximal end attached to said front end of said shell and a distal end terminated by a transportation means secured thereonto, said front legs having a pivoting means enabling said front legs to rotate thereabout the proximate center of said legs, enabling said proximal end and said distal end to be able to be located next to each other in the closed position, and a band of material, terminating at either side of said rear end of said shell, where at least one terminating point is a non-permanently closed securement means, with an amount of material that allows a user to encircle their waist, said material having a tensile strength to support the weight of said child and said apparatus with a sufficient safety factor.

2. An Improved Child Car Seat with Alternate Mobility Attributes Apparatus as in claim 1 where said handle consists of a single member where said gripping end shaped into a contour to adapt to a human hand.

3. An Improved Child Car Seat with Alternate Mobility Attributes Apparatus as in claim 1 where said handle consists of two parallel members conjoined at said gripping end by a contoured cross bar.

4. An Improved Child Car Seat with Alternate Mobility Attributes Apparatus as in claim 1 where said brace leg comprises two legs having a distal end and a proximal end, and an interconnecting member, said interconnecting member located at said distal end of said brace leg, said interconnecting member being encased in an thermoplastic elastomer whereby said thermoplastic elastomer creates a high degree of friction in relation to flooring found in the common household or dining establishment, where said brace leg is capable of sensory input as to location and position, said sensory inputs are received from indents or detents interspaced along said handle, said indents or detents providing have a tactile and an audible interface to signal location of each segment, said indent or detent having an opposing indent or detent associated at each location along said brace legs.

5. An Improved Child Car Seat with Alternate Mobility Attributes Apparatus as in claim 1, where said handle is capable of sensory input as to location and position in relation to the extension or contraction of said leg to said shell.

6. An Improved Child Car Seat with Alternate Mobility Attributes Apparatus as in claim 5 where said sensory inputs are received from indents or detents interspaced along said handle, said indents or detents providing have a tactile and an audible interface to signal location of each segment, said indent or detent having an opposing indent or detent associated at each segment along said handle.

7. An Improved Child Car Seat with Alternate Mobility Attributes Apparatus as in claim 1 where said brace leg consists of one leg having a distal end and a proximal end, said proximal end of said brace leg being encased in an thermoplastic elastomer whereby said thermoplastic elastomer creates a high degree of friction in relation to flooring found in the common household or dining establishment, where said brace leg is capable of sensory input as to location and position in relation to the extension or contraction of said leg to said shell, said sensory inputs are received from indents or detents interspaced along said handle, said indents or detents providing have a tactile and an audible interface to signal location of each segment, said indent or detent having an opposing indent or detent associated at each location along said brace legs.

8. An Improved Child Car Seat with Alternate Mobility Attributes Apparatus as in claim 1 where said transportation means describes a set of objects which when used in conjunction with said distal end of said front legs enable for the smooth transference of said apparatus across varying terrains anticipated by use of said apparatus.

9. An Improved Child Car Seat with Alternate Mobility Attributes Apparatus as in claim 1 where the distance between the surface in contact with said front legs and said brace leg when fully extended and said shell is in a range of 20 to 48 inches.

10. An Improved Child Car Seat with Alternate Mobility Attributes Apparatus as in claim 1 where said front legs retract into internal recesses of said shell out of reach of occupant of said apparatus.

11. An Improved Child Car Seat with Alternate Mobility Attributes Apparatus as in claim 1 where said rotational movement of said transference grip has multiple pre-determined locking locations, said locking locations providing a tactile and an audible interface to signal interface with said locking location.

12. A method of using an improved Child Car Seat with Alternate Mobility Attributes Apparatus, as disclosed in claim 1, said car seat being able to adapt to the needs and comfort of a child from the age of infants through young children, consisting of the steps;
removing car seat from vehicle,
attaching restraining band around waist area of user,
extending brace leg to desired height,
pivoting lower section until locked into position
lowering upper section of front legs until locked into position,
positioning handle to desired extension, and
removing restraining band from waist area of user.

13. A method of using an improved Child Car Seat with Alternate Mobility Attributes Apparatus, as disclosed in claim 1, said car seat being able to adapt to the needs and comfort of a child from the age of infants through young children an infant, consisting of the steps;
removing car seat from vehicle,
transporting said car seat to a desired using carrying handle,
attaching restraining band around waist area of user,
extending brace leg to desired height,
pivoting lower section until locked into position
lowering upper section of front legs until locked into position,
positioning handle to desired extension, and
removing restraining band from waist area of user.

* * * * *